United States Patent
Sato et al.

(10) Patent No.: US 9,869,231 B2
(45) Date of Patent: Jan. 16, 2018

(54) AMPHIBIOUS VEHICLE

(71) Applicant: MITSUBISHI HEAVY INDUSTRIES, LTD., Tokyo (JP)

(72) Inventors: Shinichi Sato, Tokyo (JP); Takashi Matsunaga, Tokyo (JP)

(73) Assignee: MITSUBISHI HEAVY INDUSTRIES, LTD., Tokyo (JP)

(*) Notice: Subject to any disclaimer, the term of this patent is extended or adjusted under 35 U.S.C. 154(b) by 110 days.

(21) Appl. No.: 14/436,205

(22) PCT Filed: Nov. 18, 2013

(86) PCT No.: PCT/JP2013/080985
§ 371 (c)(1),
(2) Date: Apr. 16, 2015

(87) PCT Pub. No.: WO2014/084075
PCT Pub. Date: Jun. 5, 2014

(65) Prior Publication Data
US 2015/0260080 A1    Sep. 17, 2015

(30) Foreign Application Priority Data
Nov. 30, 2012  (JP) .................................. 2012-263223

(51) Int. Cl.
*B60F 3/00*      (2006.01)
*B60L 3/00*      (2006.01)
(Continued)

(52) U.S. Cl.
CPC ............ *F01P 7/026* (2013.01); *B60F 3/0053* (2013.01); *F01P 7/02* (2013.01); *F01P 7/04* (2013.01); *F01P 7/048* (2013.01)

(58) Field of Classification Search
CPC .... B60F 3/007; B60F 2301/04; B60F 3/0038; B60F 3/003; B60F 3/0053; F01P 7/04;
(Continued)

(56) References Cited

U.S. PATENT DOCUMENTS

2006/0148340 A1* 7/2006 Gibbs ..................... B60F 3/003
440/12.52
2006/0183384 A1* 8/2006 Longdill ............... B60F 3/0007
440/12.5

FOREIGN PATENT DOCUMENTS

JP          5-26572 U    4/1993
JP          7-38625 U    7/1995
(Continued)

OTHER PUBLICATIONS

International Preliminary Report on Patentability and Written Opinion of the International Searching Authority (Forms PCT/IB/338, PCT/IB/373, and PCT/ISA/237) for International Application No. PCT/JP2013/080985, dated Jun. 11, 2015.
(Continued)

*Primary Examiner* — Syed O Hasan
(74) *Attorney, Agent, or Firm* — Birch, Stewart, Kolasch & Birch, LLP

(57) ABSTRACT

Provided is an amphibious vehicle with which it is possible to increase the driving power even when the engine rotational speed is low. When the engine rotational frequency is lower than a prescribed rotational frequency the fan flow volume of a fan is calculated on the basis of the fan outlet pressure (B1), the amount of heat exchange of a heat exchanger is calculated on the basis of the fan inlet temperature, the fan outlet temperature, and the fan flow volume (B2), a target fan rotational frequency is calculated on the basis of the engine rotational frequency and the heat exchange amount (B3), the fan rotational frequency is reduced so as to achieve the target fan rotational frequency (Continued)

(B4, B5), and the power transmitted to a travel device is increased, thereby increasing the drive torque (B6).

1 Claim, 7 Drawing Sheets

(51) Int. Cl.
*F01P 7/02* (2006.01)
*F01P 7/04* (2006.01)
(58) Field of Classification Search
CPC .... F01P 7/026; F01P 7/048; F01P 7/02; F01P 7/10
USPC .............. 123/41.12; 440/12.5, 12.51; 701/21
See application file for complete search history.

(56) References Cited

FOREIGN PATENT DOCUMENTS

| | | |
|---|---|---|
| JP | 2003-214231 A | 7/2003 |
| JP | 2010-269764 A | 12/2010 |

OTHER PUBLICATIONS

International Search Report and Written Opinion of the International Searching Authority (PCT/ISA/210, PCT/ISA/220, and PCT/ISA/237) for International Application No. PCT/JP2013/080985, dated Jan. 7, 2014, with an English translation of the International Search Report only.
Japanese Office Action for Japanese Application No. 2012-263223, dated May 31, 2016, with an English translation.

\* cited by examiner

AMPHIBIOUS VEHICLE

TECHNICAL FIELD

The present invention relates to an amphibious vehicle.

BACKGROUND ART

An amphibious vehicle for leisure which can travel on water and land is known. Recently, a demand for an amphibious vehicle which can approach a disaster site (isolated community or the like) from the sea in a disaster is increasing.

PRIOR ART DOCUMENT

Patent Document

Patent Document 1: Japanese Utility Model Registration Application Publication No. Hei 7-38625

SUMMARY OF THE INVENTION

Problems to be Solved by the Invention

Problems of a conventional amphibious vehicle are described with reference to FIGS. 7 and 8. Note that in FIGS. 7 and 8, reference sign Fd denotes drive force (drive torque), Fp denotes propulsion, and Lf denotes fan loss (electric power generation loss) of a heat exchanger.

As shown in FIG. 7, when landing through a rocky shore 53 or the like from the sea 51 to the land 52, the conventional amphibious vehicle 50 requires large drive force Fd for a moment. At this time, the amphibious vehicle 50 lands on the land 52 by being pushed upward by the drive force Fd of a traveling device and the propulsion Fp of a water propulsion device.

However, as shown in the graph of FIG. 8, the propulsion Fp of the water propulsion device increases in proportion to the engine rotation speed. Accordingly, when large proportion Fp in the landing or the like is dangerous, the engine rotation speed cannot be raised. Moreover, in a state where the engine rotation speed is low, large drive force Fd cannot be obtained due to the fan loss Lf, and this makes the landing from the sea 51 to the land 52 difficult.

The present invention has been made in view of the problems described above, and an object thereof is to provide an amphibious vehicle capable of increasing drive force for traveling even in a state where the engine rotation speed is low.

Means for Solving the Problems

An amphibious vehicle of a first invention for solving the problems described above comprises:

an engine configured to output power transmitted to a traveling device for traveling on land and a water propulsion device for propelling the amphibious vehicle on water;

a heat exchanger configured to cool the engine;

a fan configured to supply a coolant to the heat exchanging means;

engine rotation speed measuring means for measuring an engine rotation speed of the engine;

fan rotation speed measuring means for measuring a fan rotation speed of the fan;

entrance temperature measuring means for measuring an entrance temperature on an entrance side of the heat exchanger;

exit temperature measuring means for measuring an exit temperature on an exit side of the heat exchanger;

exit pressure measuring means for measuring an exit pressure of the coolant on the exit side of the heat exchanger; and controlling means for controlling the fan rotation speed based on measurement values of the engine rotation speed measuring means, the fan rotation speed measuring means, the entrance temperature measuring means, the exit temperature measuring means, and the exit pressure measuring means, wherein when the engine rotation speed is lower than a predetermined engine rotation speed, the controlling means:

calculates a fan flow rate of the fan based on the exit pressure;

calculates a heat exchange amount of the heat exchanger based on the entrance temperature, the exit temperature, and the fan flow rate;

calculates a target fan rotation speed of the fan based on the engine rotation speed and the heat exchange amount; and reduces the fan rotation speed such that the fan rotation speed becomes equal to the target fan rotation speed, and increases the power transmitted from the engine to the traveling device.

An amphibious vehicle of a second invention for solving the problems described above comprises:

an engine configured to output power transmitted to a traveling device for traveling on land and a water propulsion device for propelling the amphibious vehicle on water;

a heat exchanger configured to cool the engine;

a fan configured to supply a coolant to the heat exchanging means;

engine rotation speed measuring means for measuring an engine rotation speed of the engine;

fan rotation speed measuring means for measuring a fan rotation speed of the fan;

entrance temperature measuring means for measuring an entrance temperature on an entrance side of the heat exchanger;

exit temperature measuring means for measuring an exit temperature on an exit side of the heat exchanger;

fuel injection amount measuring means for measuring an fuel injection amount of the engine; and controlling means for controlling the fan rotation speed based on measurement values of the engine rotation speed measuring means, the fan rotation speed measuring means, the entrance temperature measuring means, the exit temperature measuring means, and the fuel injection amount measuring means, wherein when the engine rotation speed is lower than a predetermined engine rotation speed, the controlling means:

calculates a fan flow rate of the fan based on the engine rotation speed and the fuel injection amount;

calculates a heat exchange amount of the heat exchanger based on the entrance temperature, the exit temperature, and the fan flow rate;

calculates a target fan rotation speed of the fan based on the engine rotation speed and the heat exchange amount; and reduces the fan rotation speed such that the fan rotation speed becomes equal to the target fan rotation speed, and increases the power transmitted from the engine to the traveling device.

Effect of the Invention

In the present invention, the fan rotation speed is reduced, and the loss in the engine due to the rotation of the fan is reduced. Accordingly, the power (drive force) transmitted from the engine to the traveling device can be increased even when the engine rotation speed is low.

MODE FOR CARRYING OUT THE INVENTION

The inventors and the like of the present invention have found the following fact. As shown in FIG. 9, when an engine rotation speed is low, an actual heat radiation amount from an engine is small and a heat exchange performance mainly determined by a coolant flow rate (air flow rate) can be set to a low level. Specifically, the inventors and the like of the present invention have found that, when the engine rotation speed is suppressed to a low level in landing of an amphibious vehicle, it is possible to suppress a fan loss Lf shown in FIG. 8 and increase a drive force Fd by the suppressed amount.

Embodiments of an amphibious vehicle of the present invention based on the aforementioned findings are described below with reference to FIGS. 1 to 6.

EMBODIMENT 1

Figure 1:
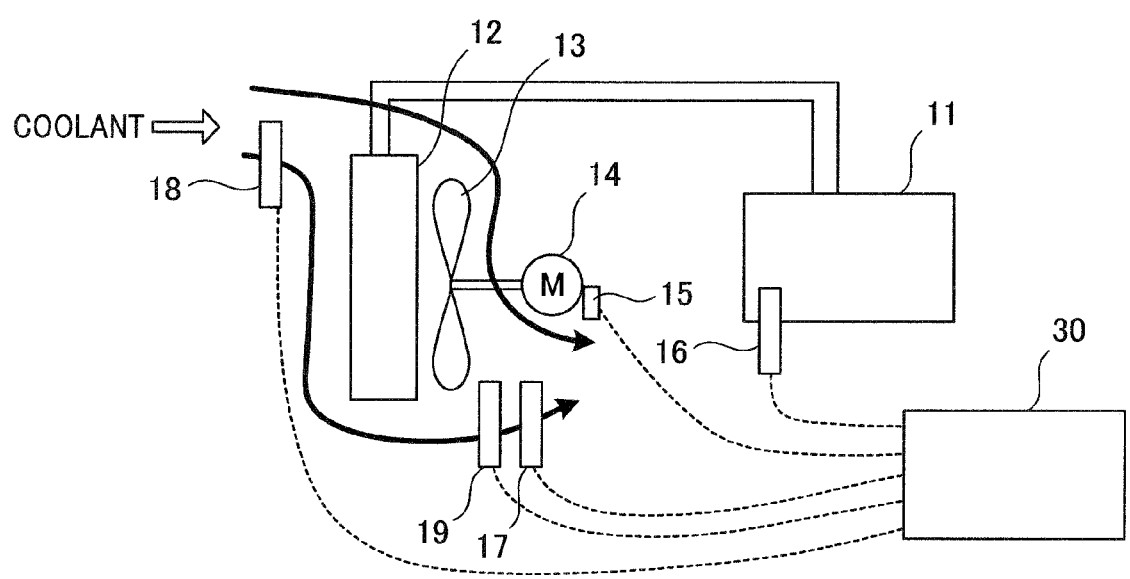
FIG. 1 is a schematic configuration diagram showing a configuration of a power part of an amphibious vehicle which is an example of an embodiment (embodiment 1) of an amphibious vehicle in the present invention.
Figure 2:
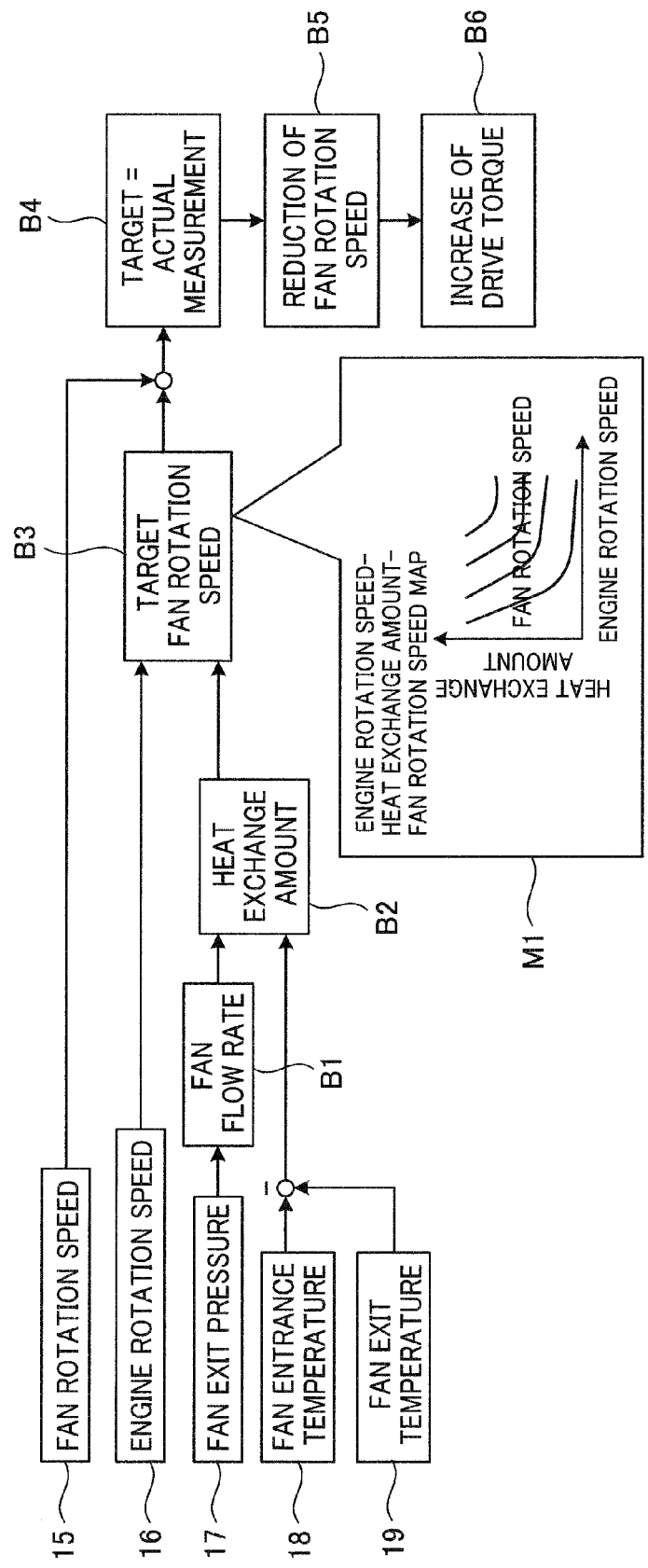
FIG. 2 is a block diagram for explaining a configuration of the power part shown in FIG. 1.
Figure 3:
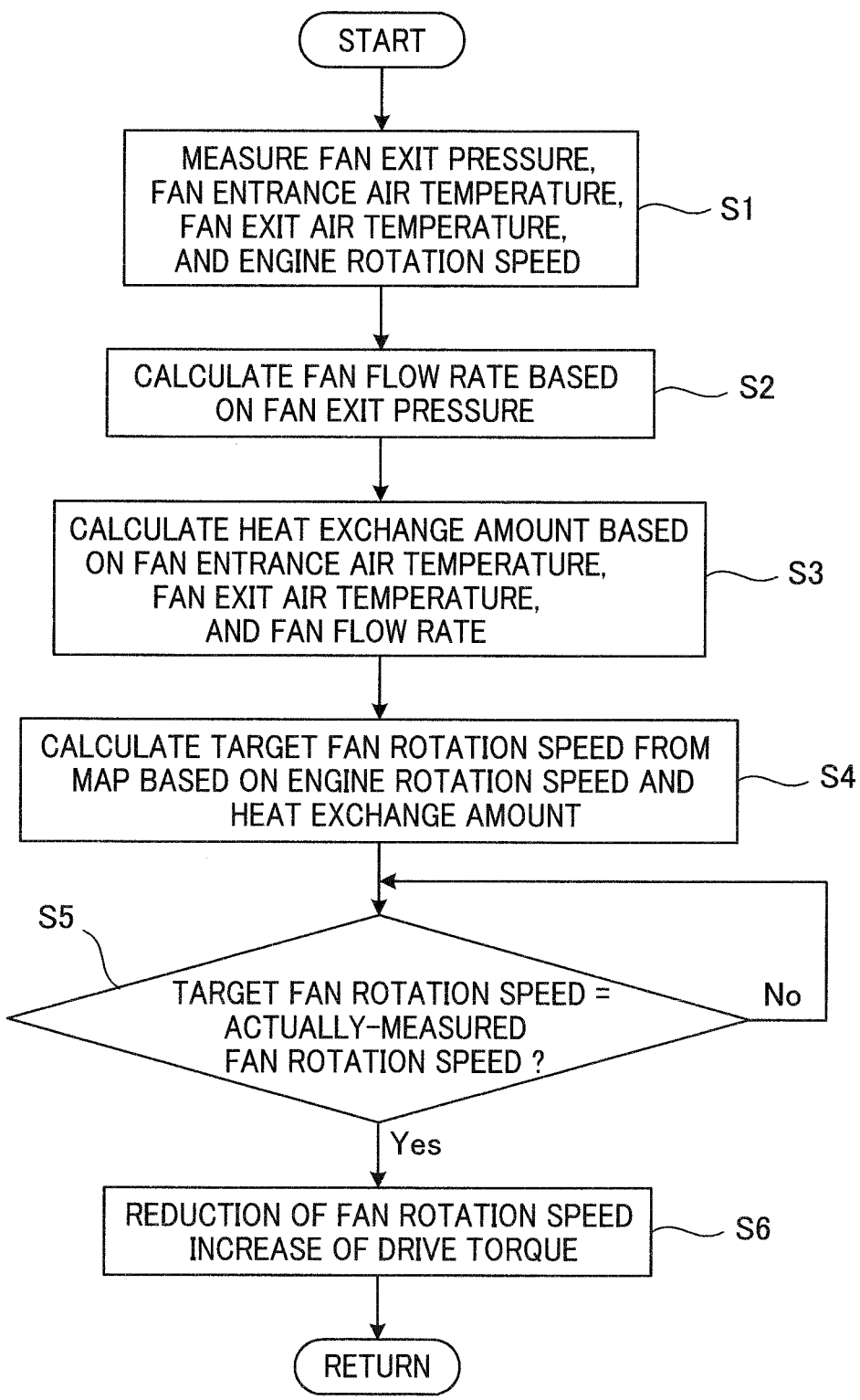
FIG. 3 is a flowchart for explaining a control procedure performed in the configuration of the power part shown in FIGS. 1 and 2.

FIG. 1 is a schematic configuration diagram showing a configuration of a power part of an amphibious vehicle of the embodiment, FIG. 2 is a block diagram for explaining a configuration of the power part, and FIG. 3 is a flowchart for explaining a control procedure performed in the configuration of the power part.

In the embodiment, the amphibious vehicle includes a traveling device (not illustrated) for traveling on land and a water propulsion device (not illustrated) for propelling the amphibious vehicle (for traveling) on water such as the sea, and power outputted from one engine 11 (internal combustion engine) is transmitted to the two devices. The engine 11 is cooled by a radiator 12 (heat exchanger). Coolant (air) is supplied to the radiator 12 by a fan 13 and a motor 14 configured to rotate the fan 13, and the flow rate of the coolant is controlled.

Moreover, a fan rotation speed measuring unit 15 (fan rotation speed measuring means) configured to measure a fan rotation speed is provided in the motor 14, and an engine rotation speed measuring unit 16 (engine rotation speed measuring means) configured to measure an engine rotation speed is provided in the engine 11. Moreover, at an entrance and an exit of the radiator 12, there are provided a fan exit pressure measuring unit 17 (exit pressure measuring means) configured to measure a fan exit pressure, a fan entrance temperature measuring unit 18 (entrance temperature measuring means) configured to measure a fan entrance temperature, and a fan exit temperature measuring unit 19 (exit temperature measuring means) configured to measure a fan exit temperature. Measurement values of these units are inputted into a control device 30 (controlling means).

When large drive torque (drive force) becomes necessary in landing or the like in a state where the engine rotation speed is lower than a predetermined engine rotation speed (for example, 3000 rpm) determined in advance, the control device 30 reduces the fan rotation speed of the fan 13 which is an accessory and increases drive torque for traveling by using the configurations described above and a control procedure to be described below. The control procedure in the control device 30 is described with reference to the block diagram of FIG. 2 and the flowchart of FIG. 3.

(Step S1)
The fan exit pressure of the coolant at the exit of the radiator 12 is measured by using the fan exit pressure measuring unit 17, the fan entrance temperature of the coolant at the entrance of the radiator 12 is measured by using the fan entrance temperature measuring unit 18, the fan exit temperature of the coolant at the exit of the radiator 12 is measured by using the fan exit temperature measuring unit 19, and the engine rotation speed of the engine 11 is measured by using the engine rotation speed measuring unit 16.

(Step S2)
A fan flow rate of the fan 13 is calculated based on the measured fan exit pressure (block B1 in FIG. 2).

(Step S3)
A heat exchange amount of the radiator 12 is calculated based on the measured fan entrance temperature, the measured fan exit temperature, and the calculated fan flow rate (block B2 in FIG. 2).

(Step S4)
A target fan rotation speed of the fan 13 is calculated from a map M1 based on the measured engine rotation speed and the calculated heat exchange amount (block B3 in FIG. 2). The map M1 shows relationships among the engine rotation speed, the heat exchange amount, and the fan rotation speed, and is determined in advance through measurement and the like.

(Steps S5 to S6)
An actual value of the fan rotation speed is measured by using the fan rotation speed measuring unit 15, the actual value and the target fan rotation speed are compared with each other, and the motor 14 is controlled such that the fan rotation speed becomes equal to the calculated target fan rotation speed (block B4 in FIG. 2). As shown in FIG. 9, when the engine rotation speed is low, the actual heat radiation amount from the engine 11 is lower than the cooling performance of the radiator 12. Accordingly, controlling the motor 14 such that the fan rotation speed becomes equal to the calculated target fan rotation speed reduces the fan rotation speed (block B5 in FIG. 2). In other words, the flow rate of the coolant for cooling the radiator 12 is reduced.

Figure 8:
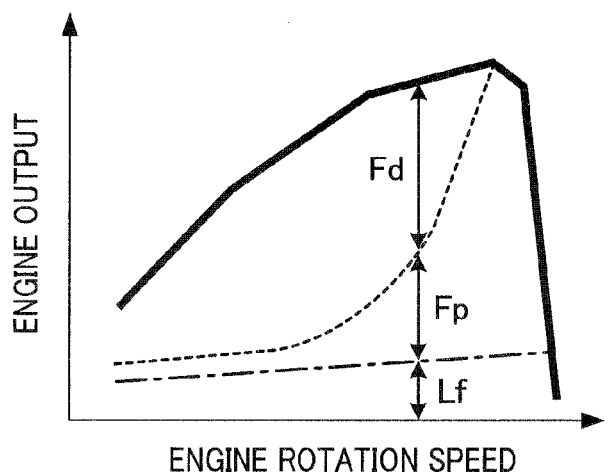
FIG. 8 is a graph showing relationships between an engine rotation speed and an engine output and also shows details of drive force, propulsion, and fan loss in the engine output.
Figure 9:
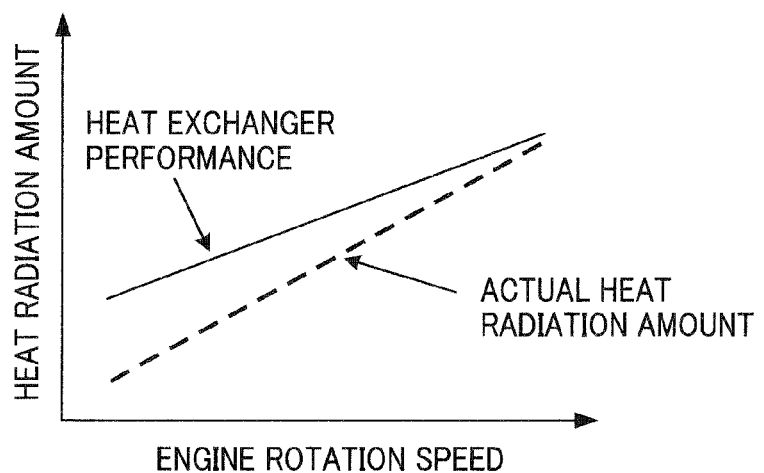
FIG. 9 is a graph showing relationships between the engine rotation and a heat radiation amount and also shows a heat radiation amount of a heat exchanger performance and an actual heat radiation amount of the engine.

Since the shaft power of the fan 13 is proportional to a cube of the rotation speed thereof, reducing the fan rotation speed can greatly reduce the fan loss (Lf) (electric power generation loss for driving the motor 14) shown in FIG. 8 and increase a net torque in the engine 11. As a result, it is possible to use power obtained by the reduction of the fan loss Lf as the drive force Fd and thereby increase the drive force Fd (block B6 in FIG. 2).

As described above, when large drive torque becomes necessary in landing or the like in a state where the engine rotation speed is lower than the predetermined engine rotation speed determined in advance, the fan rotation speed of the fan 13 is reduced to suppress the fan loss Lf shown in FIG. 8, and the power obtained by the suppression is used as the drive force Fd of the traveling device to increase the drive force Fd.

EMBODIMENT 2

Figure 4:
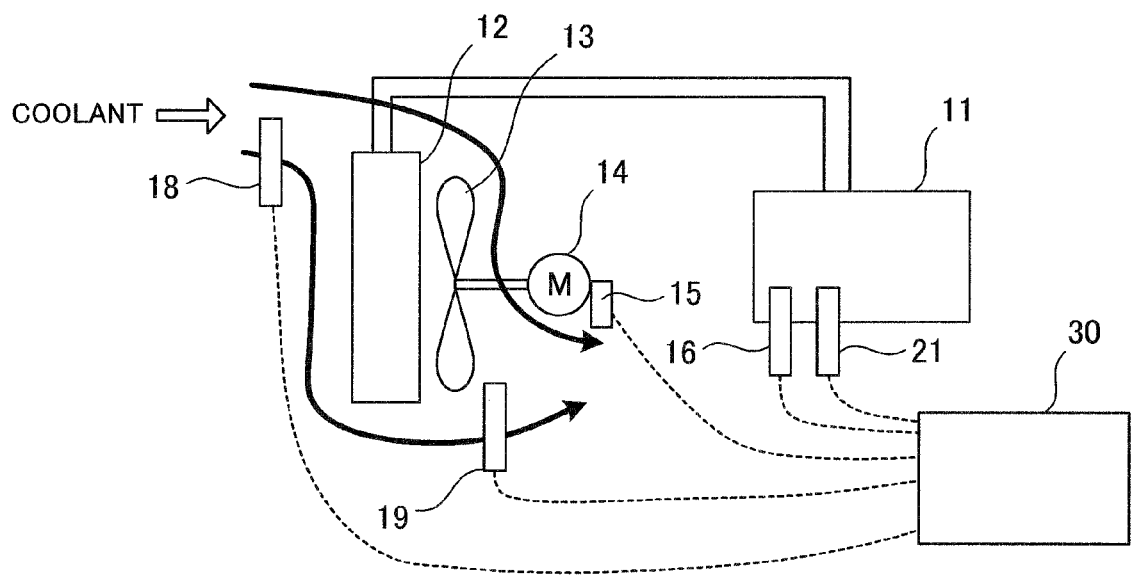
FIG. 4 is a schematic configuration diagram showing a configuration of a power part in an amphibious vehicle which is another example of an embodiment (embodiment 2) of the amphibious vehicle in the present invention.
Figure 5:
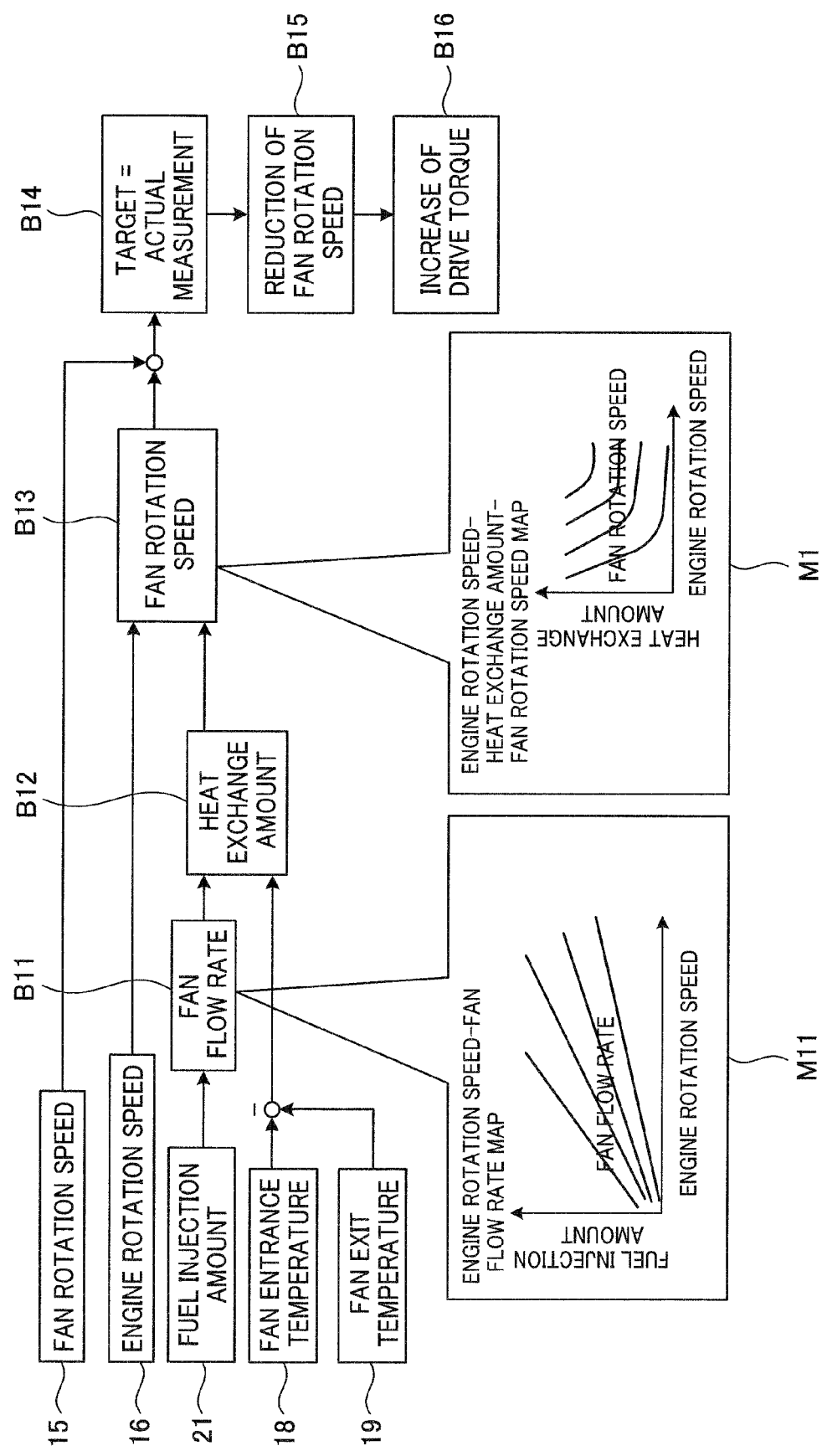
FIG. 5 is a block diagram for explaining a configuration of the power part shown in FIG. 4.
Figure 6:
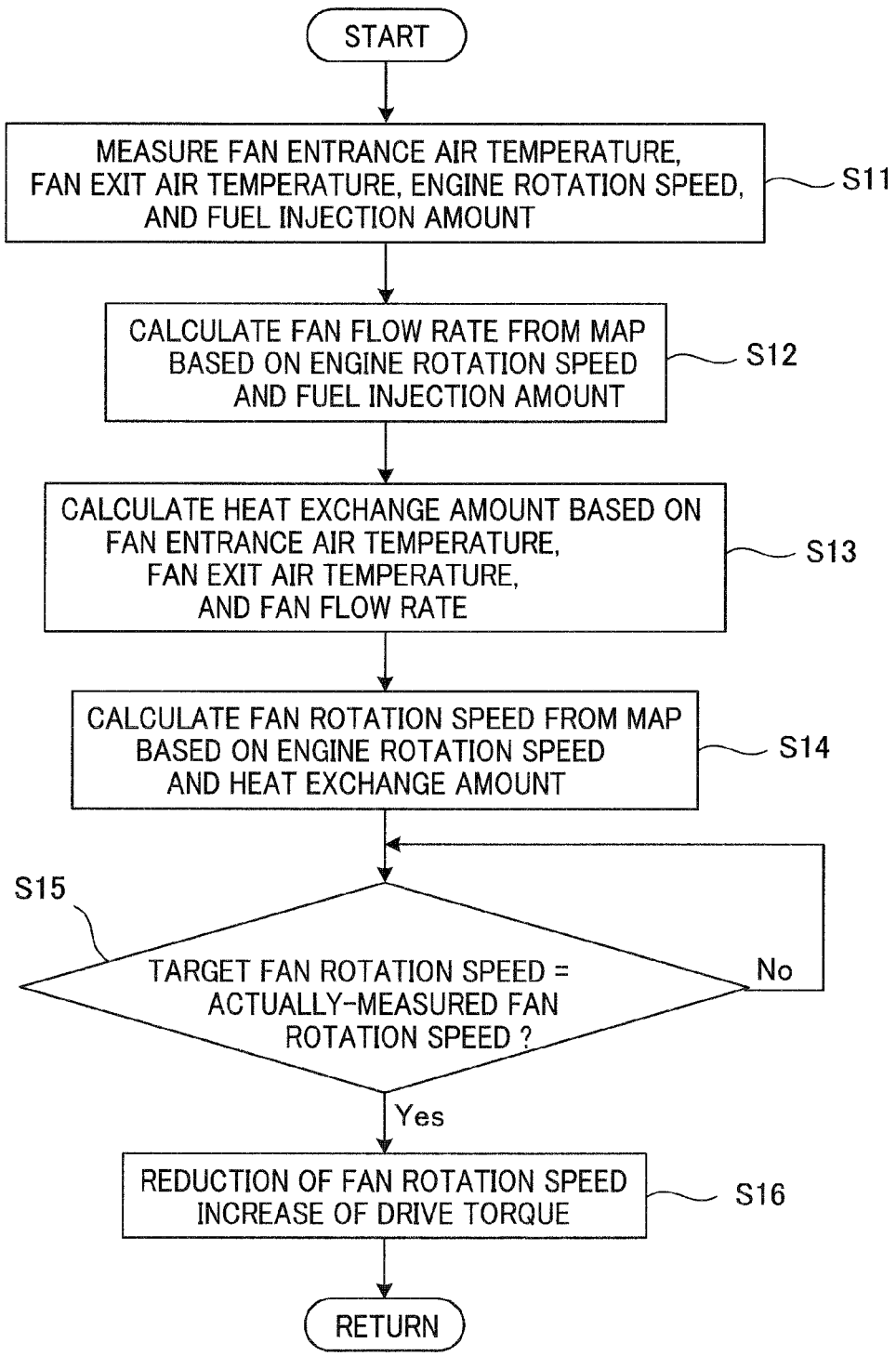
FIG. 6 is a flowchart for explaining a control procedure performed in the configuration of the power part shown in FIGS. 4 and 5.
Figure 7:
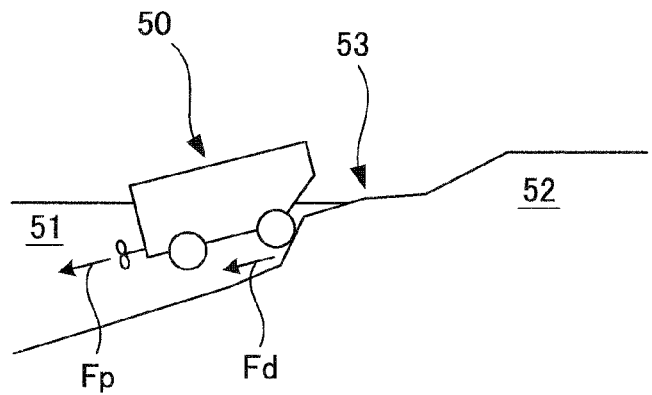
FIG. 7 is a view for explaining problems in a conventional amphibious vehicle.

FIG. 4 is a schematic configuration diagram showing a configuration of a power part of an amphibious vehicle of the embodiment, FIG. 5 is a block diagram for explaining a configuration of the power part, and FIG. 6 is a flowchart for explaining a control procedure performed in the configuration of the power part.

The amphibious vehicle in the embodiment has substantially the same configurations as the amphibious vehicle shown in Embodiment 1 (FIGS. 1 and 2). Accordingly, the same configurations as the configurations of the amphibious vehicle shown in Embodiment 1 (FIGS. 1 and 2) are denoted by the same reference numerals in FIGS. 4 and 5.

Although the amphibious vehicle in the embodiment has substantially the same configurations as those in the amphibious vehicle shown in Embodiment 1 (FIG. 1), a fuel injection amount measuring unit 21 (fuel injection amount measuring means) configured to measure a fuel injection amount of the engine 11 is provided in the engine 11 instead of the fan exit pressure measuring unit 17 shown in FIG. 1. A measurement value of the fuel injection amount measuring unit 21 is also inputted into the control device 30 (controlling means).

Also in the embodiment, when large drive torque (drive force) becomes necessary in landing or the like in a state where the engine rotation speed is lower than a predetermined engine rotation speed (for example, 3000 rpm) determined in advance, the control device 30 reduces the fan rotation speed of the fan 13 which is an accessory and increases drive torque by using the configurations described above and a control procedure to be described later. The control procedure in the control device 30 is described with reference to the block diagram of FIG. 5 and the flowchart of FIG. 6.

(Step S11)

The fan entrance temperature of the coolant at the entrance of the radiator 12 is measured by using the fan entrance temperature measuring unit 18, the fan exit temperature of the coolant at the exit of the radiator 12 is measured by using the fan exit temperature measuring unit 19, the engine rotation speed of the engine 11 is measured by using the engine rotation speed measuring unit 16, and the fuel injection amount of the engine 11 is measured by using the fuel injection amount measuring unit 21.

(Step 12)

The fan flow rate of the fan 13 is calculated from a map M11 based on the measured engine rotation speed and the measured fuel injection amount (block B11 in FIG. 5). The map M11 shows relationships among the engine rotation speed, the fuel injection amount, and the fan flow rate, and is determined in advance through measurement and the like.

(Step S13)

The heat exchange amount of the radiator 12 is calculated based on the measured fan entrance temperature, the measured fan exit temperature, and the calculated fan flow rate (block B12 in FIG. 5).

(Step S14)

The target fan rotation speed of the fan 13 is calculated from the map M1 based on the measured engine rotation speed and the calculated heat exchange amount (block B13 in FIG. 5).

(Step S15 to S16)

An actual value of the fan rotation speed is measured by using the fan rotation speed measuring unit 15, the actual value and the target fan rotation speed are compared with each other, and the motor 14 is controlled such that the fan rotation speed becomes equal to the calculated target fan rotation speed (block B14 in FIG. 5). As shown in FIG. 9, when the engine rotation speed is low, the actual heat radiation amount from the engine 11 is lower than the cooling performance of the radiator 12. Accordingly, controlling the motor 14 such that the fan rotation speed becomes equal to the calculated target fan rotation speed reduces the fan rotation speed (block B15 in FIG. 5). In other words, the flow rate of the coolant for cooling the radiator 12 is reduced.

Since the shaft power of the fan 13 is proportional to the cube of the rotation speed thereof, reducing the fan rotation speed can greatly reduce the fan loss (Lf) (electric power generation loss for driving the motor 14) shown in FIG. 8 and increase the net torque in the engine 11. As a result, it is possible to use power obtained by the reduction of the fan loss Lf as the drive force Fd and thereby increase the drive force Fd (block B16 in FIG. 5).

As described above, when large drive torque becomes necessary in landing or the like in a state where the engine rotation speed is lower than the predetermined engine rotation speed determined in advance, the fan rotation speed of the fan 13 is reduced to suppress the fan loss Lf shown in FIG. 8, and the power obtained by the suppression is used as the drive force Fd of the traveling device to increase the drive force Fd.

INDUSTRIAL APPLICABILITY

The present invention is suitable for amphibious vehicles and is particularly suitable for amphibious vehicles and the like which can travel across rough roads and flooded areas of a disaster site and approach the disaster site (isolated community or the like) from the sea.

EXPLANATION OF THE REFERENCE NUMERALS 11 engine
12 radiator (heat exchanger)
13 fan
14 motor
15 fan rotation speed measuring unit (fan rotation speed measuring means)
16 engine rotation speed measuring unit (engine rotation speed measuring means)

17 fan exit pressure measuring unit (exit pressure measuring means)
18 fan entrance temperature measuring unit (entrance temperature measuring means)
19 fan exit temperature measuring unit (exit temperature measuring means)
21 fuel injection amount measuring unit (fuel injection amount measuring means)
30 control device (controlling means)

The invention claimed is:

1. An amphibious vehicle comprising: an engine configured to output power transmitted to a traveling device for traveling on land and a water propulsion device for propelling the amphibious vehicle on water; a heat exchanger configured to cool the engine; a fan configured to supply air to the heat exchanger; an engine rotation speed measuring device for measuring an engine rotation speed of the engine; a fan rotation speed measuring device for measuring a fan rotation speed of the fan; an entrance temperature measuring device for measuring an entrance temperature of the air on an entrance side of the heat exchanger; an exit temperature measuring device for measuring an exit temperature of the air on an exit side of the heat exchanger; a fuel injection amount measuring device for measuring a fuel injection amount of the engine; and a control device for controlling the fan rotation speed based on measurement values measured by the engine rotation speed measuring device, the fan rotation speed measuring device, the entrance temperature measuring device, the exit temperature measuring device, and the fuel injection amount measuring device, wherein when the engine rotation speed is lower than a predetermined engine rotation speed, the controlling device: calculates a fan flow rate of the fan from predetermined relationships among the engine rotation speed, the fuel injection amount and the fan flow rate; calculates a heat exchange amount of the heat exchanger based on the air entrance temperature, the air exit temperature, and the fan flow rate; calculates a target fan rotation speed of the fan from predetermined relationships among the engine rotation speed, the heat exchange amount and the target fan rotation speed; and the control device reducing the fan rotation speed such that the fan rotation speed becomes equal to the target fan rotation speed, thus reducing loss in the engine due to rotation of the fan, and increasing a driving force transmitted from the engine to the traveling device by the reduction of the loss.

* * * * *